US011941482B1

United States Patent
Rigetti et al.

(10) Patent No.: US 11,941,482 B1
(45) Date of Patent: Mar. 26, 2024

(54) OPERATING A QUANTUM PROCESSOR IN A HETEROGENEOUS COMPUTING ARCHITECTURE

(71) Applicant: Rigetti & Co, LLC, Berkeley, CA (US)

(72) Inventors: Chad Tyler Rigetti, Walnut Creek, CA (US); William J. Zeng, Berkeley, CA (US); Dane Christoffer Thompson, Granite Bay, CA (US)

(73) Assignee: Rigetti & Co, LLC, Berkeley, CA (US)

( * ) Notice: Subject to any disclaimer, the term of this patent is extended or adjusted under 35 U.S.C. 154(b) by 243 days.

(21) Appl. No.: 17/196,692

(22) Filed: Mar. 9, 2021

Related U.S. Application Data

(60) Continuation of application No. 16/834,458, filed on Mar. 30, 2020, now Pat. No. 10,956,830, which is a
(Continued)

(51) Int. Cl.
*G06N 10/00* (2022.01)
*G06F 9/30* (2018.01)
*G06F 9/38* (2018.01)
*G06F 15/16* (2006.01)

(52) U.S. Cl.
CPC ......... *G06N 10/00* (2019.01); *G06F 9/30043* (2013.01); *G06F 9/3877* (2013.01); *G06F 15/16* (2013.01)

(58) Field of Classification Search
CPC ..................................................... G06N 10/00
See application file for complete search history.

(56) References Cited

U.S. PATENT DOCUMENTS 5,940,193 A * 8/1999 Hotaling ................ G06N 10/00
359/107
7,875,876 B1 1/2011 Wandzura et al.
(Continued)

FOREIGN PATENT DOCUMENTS

CN 105787292 7/2016
WO 2005122052 12/2005
(Continued)

OTHER PUBLICATIONS

EPO, Communication pursuant to Article 94(3) EPC dated Oct. 26, 2022, in EP 17857532.0, 5 pgs.
(Continued)

*Primary Examiner* — Michael J Metzger
(74) *Attorney, Agent, or Firm* — Henry Patent Law Firm PLLC

(57) ABSTRACT

In some aspects, a heterogeneous computing system includes a quantum processor unit and a classical processor unit. In some instances, variables defined by a computer program are stored in a classical memory in the heterogeneous computing system. The computer program is executed in the heterogeneous computing system by operation of the quantum processor unit and the classical processor unit. Instructions are generated for the quantum processor by a host processor unit based on values of the variables stored in the classical memory. The instructions are configured to cause the quantum processor unit to perform a data processing task defined by the computer program. The values of the variables are updated in the classical memory based on output values generated by the quantum processor unit. The classical processor unit processes the updated values of the variables.

24 Claims, 5 Drawing Sheets

Related U.S. Application Data continuation of application No. 16/548,352, filed on Aug. 22, 2019, now Pat. No. 10,650,324, which is a continuation of application No. 16/170,302, filed on Oct. 25, 2018, now Pat. No. 10,402,743, which is a division of application No. 14/822,317, filed on Aug. 10, 2015, now Pat. No. 10,127,499.

(60) Provisional application No. 62/035,972, filed on Aug. 11, 2014.

(56) References Cited

U.S. PATENT DOCUMENTS

| | | | |
|---|---|---|---|
| 8,175,995 | B2 | 5/2012 | Amin |
| 8,832,164 | B2 | 9/2014 | Allen et al. |
| 8,832,165 | B2 | 9/2014 | Allen et al. |
| 9,286,154 | B2 | 3/2016 | Ashikhmin |
| 9,819,347 | B2 | 11/2017 | Hastings et al. |
| 10,127,499 | B1 | 11/2018 | Rigetti et al. |
| 10,402,743 | B1 | 9/2019 | Rigetti et al. |
| 10,633,248 | B2 | 4/2020 | Ashikhmin |
| 10,650,324 | B1 | 5/2020 | Rigetti et al. |
| 10,671,559 | B2 | 6/2020 | Mohseni et al. |
| 10,698,789 | B1 | 6/2020 | Liu et al. |
| 10,956,830 | B1 | 3/2021 | Rigetti et al. |
| 2005/0005266 | A1 | 1/2005 | Datig |
| 2005/0182614 | A1* | 8/2005 | Meredith ............... B82Y 10/00 257/14 |
| 2005/0273306 | A1 | 12/2005 | Hilton et al. |
| 2006/0101236 | A1 | 5/2006 | Han |
| 2006/0224547 | A1 | 10/2006 | Ulyanov et al. |
| 2007/0239366 | A1 | 10/2007 | Hilton et al. |
| 2009/0070402 | A1* | 3/2009 | Rose ...................... G06N 10/00 709/201 |
| 2009/0075825 | A1 | 3/2009 | Rose et al. |
| 2009/0157778 | A1 | 6/2009 | Allen et al. |
| 2009/0164435 | A1 | 6/2009 | Routt |
| 2011/0137632 | A1 | 6/2011 | Paxson et al. |
| 2011/0238378 | A1 | 9/2011 | Allen et al. |
| 2011/0313741 | A1 | 12/2011 | Langhoff |
| 2012/0079177 | A1 | 3/2012 | Brewer et al. |
| 2012/0192200 | A1 | 7/2012 | Rao et al. |
| 2012/0254586 | A1 | 10/2012 | Amin et al. |
| 2013/0160016 | A1 | 6/2013 | Gummaraju et al. |
| 2013/0222399 | A1 | 8/2013 | Bourd et al. |
| 2013/0332702 | A1 | 12/2013 | Boudier |
| 2014/0164313 | A1 | 6/2014 | Alboszta et al. |
| 2014/0187427 | A1* | 7/2014 | Macready ................ G06N 7/01 706/46 |
| 2014/0229722 | A1* | 8/2014 | Harris .................... B82Y 10/00 713/1 |
| 2014/0297247 | A1 | 10/2014 | Troyer et al. |
| 2014/0354326 | A1 | 12/2014 | Bonderson et al. |
| 2015/0006443 | A1* | 1/2015 | Rose ................... G06V 10/772 706/12 |
| 2015/0142398 | A1 | 5/2015 | Miller et al. |
| 2017/0161632 | A1 | 6/2017 | Freedman et al. |
| 2017/0179960 | A1 | 6/2017 | Hastings et al. |
| 2018/0096085 | A1 | 4/2018 | Rubin |

FOREIGN PATENT DOCUMENTS

| | | |
|---|---|---|
| WO | 2013006836 | 1/2013 |
| WO | 2018064535 | 4/2018 |

OTHER PUBLICATIONS

KIPO, International Search Report and Written Opinion of the ISA dated Jan. 19, 2018, in PCT/US2017/054421, 10 pgs.
USPTO, Notice of Allowance dated Dec. 30, 2020, in U.S. Appl. No. 15/720,088, 10 pgs.
USPTO, Third Party Submission filed May 10, 2018, in U.S. Appl. No. 15/720,088, 15 pgs.
USPTO, Non-Final Office Action dated Dec. 19, 2019, in U.S. Appl. No. 15/720,088, 17 pgs.
USPTO, Third Party Submission filed Jun. 19, 2018, in U.S. Appl. No. 15/720,088, 21 pgs.
USPTO, Final Office Action dated Jul. 24, 2020, in U.S. Appl. No. 15/720,088, 25 pgs.
USPTO, Advisory Action dated Oct. 9, 2020, in U.S. Appl. No. 15/720,088, 3 pgs.
EPO, Extended European Search Report dated Jun. 26, 2020, in EP 17857532.0, 9 pgs.
"Python-based Simulations of Chemistry Framework", available at https://github.com/sunqm/pyscf at least as early as Feb. 8, 2021, 4 pgs.
Advanced Micro Devices, Inc. , "What is Heterogeneous Computing", AMD Developer Central; http://developer.amd.com/resources/heterogenous-computing/what-is-heterogeneous-computing/; copyright 2014; accessed Aug. 9, 2015, 7 pgs.
Bauer, Bela , et al., "Hybrid quantum-classical approach to correlated materials", 1510.03859v2 [quant-ph], Aug. 29, 2016, 11 pgs.
Booth , et al., "Spectral functions of strongly correlated extended systems via an exact quantum embedding", Physical Review B91, 155107, 2015, 7 pgs.
Bravyi , et al., "Improved Classical Simulation of Quantum Circuits Dominated by Clifford Gates", arXiv:1601.07601v2 [quant-ph], Jan. 27, 2017, 20 pgs.
Bravyi , et al., "Trading classical and quantum computational resources; arXiv:1506.01396v1 [quant-ph], Jun. 3, 2015", 14 pgs.
Bulik , et al., "Can single-reference coupled cluster theory describe static correlation?", arXiv:1505.01894v1 [physics.chem-ph] May 8, 2015, May 11, 2015, 10 pgs.
Bulik , et al., "Density matrix embedding from broken symmetry lattice mean fields", Physical Review B89, 035140, 2014, 13 pgs.
Bulik , "Electron correlation in extended systems via quantum embedding", Doctoral thesis, Rice University, May 2015, 118.
Bulik , et al., "Electron correlation in solids via density embedding theory", The Journal of Chemical Physics 141, 054113, 2014, 11 pgs.
Corcoles , et al., "Process verification of two-qubit quantum gates by randomized benchmarking", Physical Review A 87, 030301(R)(2013), Mar. 19, 2013, 4 pgs.
Crawford , et al., "An Introduction to Coupled Cluster Theory for Computational Chemists", Reviews in Computational Chemistry, vol. 14, 2000, 105.
Dallaire-Demers, Pierre-Luc , et al., "Quantum gates and architecture for the quantum simulation of the Fermi-Hubbard model", arXiv:1606.00208v1 [quant-ph], Jun. 2, 2016, 13 pgs.
Gidofalvi , et al., "Multireference self-consistent-field energies without the many-electron wave function through a variational low-rank two-electron reduced-density-matrix method", The Journal of Chemical Physics 127, 244105, Dec. 28, 2007, 7 pgs.
Helgaker , et al., "Molecular Electronic-Structure Theory", John Wiley & Sons Ltd., West Sussex, England, 2000, 8 pgs.
Hosteny , et al., "Ab initio study of the pi-electron states of trans-butadiene", The Journal of Chemical Physics, vol. 62, No. 12, Jun. 15, 1975, 17 pgs.
Knizia , et al., "Density Matrix Embedding: A Simple Alternative to Dynamical Mean-Field Theory", Physical Review Letters PRL 109,186404, Nov. 2, 2012, 6 pgs.
Knizia , et al., "Density Matrix Embedding: A Strong-Coupling Quantum Embedding Theory", Journal of Chemical Theory and Computation, Feb. 21, 2013, 6 pgs.
Kretchmer , et al., "A real-time extension of density matrix embedding theory for non-equilibrium electron dynamics", arXiv:1609.07678v2, Nov. 1, 2017, 15 pgs.
Kreula , et al., "Few-qubit quantum-classical simulation of strongly correlated lattice fermions", EPJ Quantum Technology 3:11, 2016, 19 pgs.
Li , et al., "Hybrid parallel tempering and simulated annealing method", Applied Mathematics and Computation, vol. 212, Issue 1, pp. 216-228, Jun. 1, 2009.
Lieb , et al., "The one-dimensional Hubbard model: a reminiscence", Physica A 321; www.elsevier.com/locate/physa, 2003, 27 pgs.

(56) References Cited

OTHER PUBLICATIONS

Mcclean, Jarrod Ryan, "Algorithms Bridging Quantum Computation and Chemistry", Doctoral dissertation, Harvard University, Graduate School of Arts & Sciences; http://nrs.harvard.edu/urn-3:HUL.InstRepos:17467376, May 1, 2015, 245 pgs.

Mcclean, J. R., et al., "Hybrid Quantum—Classical Hierarchy for Mitigation of Decoherence and Determination of Excited States", arXiv:1603.05681v1 [quant-ph], Mar. 17, 2016, 10 pgs.

Mcclean, et al., "The theory of variational hybrid quantum-classical algorithms", New J. Phys. 18 (2016)023023, Feb. 5, 2016, 23 pgs.

Neilsen, et al., "Quantum Computation and Quantum Information", Cambridge University Press; Cambridge, UK, 2010, 13 pgs.

O'Malley, et al., "Scalable Quantum Simulation of Molecular Energies", Phys. Rev. X 6, 031007, 2016, 13 pgs.

O'Malley, et al., "Scalable Quantum Simulation of Molecular Energies", arXiv:1512.06860v2 [quant-ph], Feb. 4, 2017, 13 pgs.

Peruzzo, Alberto, et al., "A Variational Eigenvalue Solver on a Photonic Quantum Processor", Nature Communications, DOI: 10.1038/ncomms5213, Jul. 23, 2014, 7 pgs.

Peruzzo, et al., "A variational eigenvalue solver on a quantum processor", ArXiv:1304.3061v1 [quant-ph], Apr. 10, 2013, 10 pgs.

Peschel, et al., "Entanglement in Solvable Many-Particle Models", arXiv:1109.0159v1 [cond-mat.stat-mech], Sep. 1, 2011, 44 pgs.

Reiher, et al., "Elucidating Reaction Mechanisms on Quantum Computers", arXiv:1605.03590v2 [quant-ph], May 25, 2016, 28 pgs.

Rubin, "A Hybrid Classical/Quantum Approach for Large-Scale Studies of quantum Systems with Density Matrix Embedding Theory", arXiv:1610.06910v1, Oct. 21, 2016, 12 pgs.

Rubin, "A Hybrid Classical/Quantum Approach for Large-Scale Studies of Quantum Systems with Density Matrix Embedding Theory", arXiv:1610.06910v2, Oct. 24, 2016, 10 pgs.

Sawaya, et al., "Error Sensitivity to Environmental Noise in Quantum Circuits for Chemical State Preparation", Journal of Chemical Theory and Computation, ACS Publications, Jun. 2, 2016, 13 pgs.

Scuseria, et al., "An efficient reformulation of the closed-shell coupled cluster single and double excitation (CCSD) equations", J. Chem. Phys. 89(12), Dec. 15, 1988, 7 pgs.

Seeley, et al., "The Bravyi-Kitaev transformation for quantum computation of electronic structure", The Journal of Chemical Physics 137, 224109, Dec. 12, 2012, 17 pgs.

Selinger, et al., "A lambda calculus for quantum computation with classical control", arXiv:cs/0404056v2 [cs.LO], Nov. 2004, 15 pgs.

Shiba, "Magnetic Susceptibility at Zero Temperature for the One-Dimensional Hubbard Model", Physical Review B, vol. 6, No. 3, Aug. 1, 1972, 10 pgs.

Smith, R. S., et al., "A Practical Quantum Instruction Set Architecture", arXiv:1608.03355v2 [quant-ph], Feb. 17, 2017, 15 pages.

Suzuki, "Convergence of General Decompositions of Exponential Operators", Commun. Math. Phys. 163, 491-508, 1994, 19 pgs.

Szabo, et al., "Modern Quantum Chemistry: Introduction to Advanced Electronic Structure Theory", Macmillan Publishing Co., Inc., 1982, 48 pgs.

EPO, Communication pursuant to Article 94(3) dated Apr. 15, 2021, in EP 17857532.0, 7 pgs.

"Parallel computing—Wikipedia", https://en.wikipedia.org/w/index.php?title=Parallel_computing&oldid=741532971 (retrieved on Mar. 31, 2021), Sep. 28, 2016, 20 pgs.

Lanyon, et al., "Experimental quantum computing without entanglement", arXiv:0807.0668v1, Jul. 4, 2008, 5 pgs.

Tranter, et al., "The Bravyi-Kitaev Transformation: Properties and Applications", Int'l Journal of Quantum Chemistry 115, 1431-1441, 2015, 12 pgs.

Trotter, "On the Product of Semi-Groups of Operators", Proceedings of the American Mathematical Society 10, 545, 1959, 7 pgs.

Tsuchimochi, et al., "Density matrix embedding in an antisymmetrized geminal power bath", The Journal of Chemical Physics 143, 024107, 2015, 12 pgs.

Wang, et al., "Quantum Simulation of Helium Hydride Cation in a Solid-State Spin Register", ACS NANO, vol. 9, No. 8, 7769-7774, www.acsnano.org, Apr. 23, 2015, 14 pgs.

Wecker, Dave, et al., "Towards Practical Quantum Variational Algorithms", arXiv:1507.08969v2 [quant-ph], Sep. 8, 2015, 11 pages.

Werner, et al., "A second order multiconfiguration SCF procedure with optimum convergence", J. Chem. Phys. 82 (11), Jun. 1, 1985, 12 pgs.

Whitfield, James D., et al., "Simulation of Electronic Structure Hamiltonians Using Quantum Computers", arXiv:1001.3855v3 [quant-ph], Dec. 19, 2010, 22 pages.

Wiebe, et al., "Quantum Deep Learning", arXiv:1412.3489v2 [quant-ph], May 2015, 34 pgs.

Wouters, et al., "A Practical Guide to Density Matrix Embedding Theory in Quantum Chemistry", J.Chem.Theory Comput., May 9, 2016, 15 pgs.

Zheng, Bo-Xiao, et al., "Cluster size convergence of the density matrix embedding theory and its dynamical cluster formulation: a study with an auxiliary-field quantum Monte Carlo solver", arXiv:1608.03316v1 [cond-mat.str-el], Aug. 11, 2016, 14 pgs.

Zheng, et al., "Ground-state phase diagram of the square lattice Hubbard model from density matrix embedding theory", arXiv:1504.01784v3 [cond-mat.str-el], May 21, 2015, 17 pgs.

EPO, Communication pursuant to Article 94(3) dated Nov. 16, 2021, in EP 17857532.0, 6 pgs.

EPO, Communication pursuant to Article 94(3) issued in European Application No. 17857532.0 dated Aug. 9, 2023, 6 pages.

USPTO, Non-Final Office Action issued in U.S. Appl. No. 17/192,604 dated Oct. 17, 2023, 81 pages.

Britt, Keith A., et al., "High-Performance Computing with Quantum Processing Units", arXiv: 1511.04386v1, 2015.

Van Meter, Rodney, et al., "Local and Distributed Quantum Computation", arXiv: 1605.06951v1, May 2016.

Wouters, Sebastian, et al., "Five years of density matrix embedding theory", arXiv: 1605.05547v1, Mar. 2016.

* cited by examiner

OPERATING A QUANTUM PROCESSOR IN A HETEROGENEOUS COMPUTING ARCHITECTURE

CROSS REFERENCE TO RELATED APPLICATIONS

This application is a continuation of U.S. patent application Ser. No. 16/834,458, filed Mar. 30, 2020, entitled "Operating a Quantum Processor in a Heterogeneous Computing Architecture," which is a continuation of U.S. patent application Ser. No. 16/548,352, filed Aug. 22, 2019, entitled "Operating a Quantum Processor in a Heterogeneous Computing Architecture," now U.S. Pat. No. 10,650,324, which is a continuation of U.S. patent application Ser. No. 16/170,302, filed Oct. 25, 2018, entitled "Operating a Quantum Processor in a Heterogeneous Computing Architecture," now U.S. Pat. No. 10,402,743, which is a divisional of U.S. patent application Ser. No. 14/822,317, filed Aug. 10, 2015, entitled "Operating a Quantum Processor in a Heterogeneous Computing Architecture," now U.S. Pat. No. 10,127,499 which claims priority to U.S. Provisional Patent Application No. 62/035,972, filed on Aug. 11, 2014, entitled "Heterogeneous Computing Architecture with Quantum Processor. The entire contents of all above-referenced priority applications are hereby incorporated by reference.

TECHNICAL FIELD

The subject matter described here relates to operating a quantum processor in a heterogeneous computing environment.

BACKGROUND

Quantum computing generally involves storage or processing of information in quantum mechanical states of light or matter. Information stored in these systems can display the quantum properties of the storage medium. These properties are different from classical Newtonian laws of physics that govern classical computing hardware. Significant evidence shows that the quantum computing paradigm allows certain advantages; for example, some problems can be solved by a quantum computer using exponentially fewer resources (e.g., time, memory size, energy) than would be used by the best known classical algorithms and computing systems.

SUMMARY

In a general aspect, a heterogeneous computing system includes a quantum processor unit and a classical processor unit.

In some instances, variables defined by a computer program are stored in a classical memory in a heterogeneous computing system. The computer program is executed in the heterogeneous computing system by operation of the quantum processor unit and the classical processor unit. Instructions are generated for the quantum processor unit by a host processor unit based on values of the variables stored in the classical memory. The instructions are configured to cause the quantum processor unit to perform a data processing task defined by the computer program. The values of the variables are updated in the classical memory based on output values generated by the quantum processor unit. The classical processor unit processes the updated values of the variables.

The details of one or more example implementations are provided in the accompanying drawings and the description below. Other features, objects, and advantages of the subject matter will be apparent from the description and drawings, and from the claims.

DETAILED DESCRIPTION

The following description relates to constructing and operating a heterogeneous computing system that combines a quantum processor unit with one or more other computing hardware devices, which may include classical computing devices or other quantum processors. In some implementations, heterogeneous computing uses multiple distinct processor types to solve problems. In classical computing, performance may be gained by adding additional processing modules of the same type, for example, adding additional processing cores to a CPU. Performance may also be gained by adding processors of different types. Different segments of the problem may then be sent to different hardware types for processing.

Certain problems benefit from access to a quantum processor unit. For example, some algorithms that can be run on a quantum processor provide dramatic speedup compared to the best known algorithms for the same problem run on classical computing hardware. However, quantum processors may not provide speedup or even be competitive with classical computing processor types for other types of problems. In some cases, problems that benefit from quantum processing are intertwined with problems that are better executed on one or more classical computing modules.

Figure 3A:
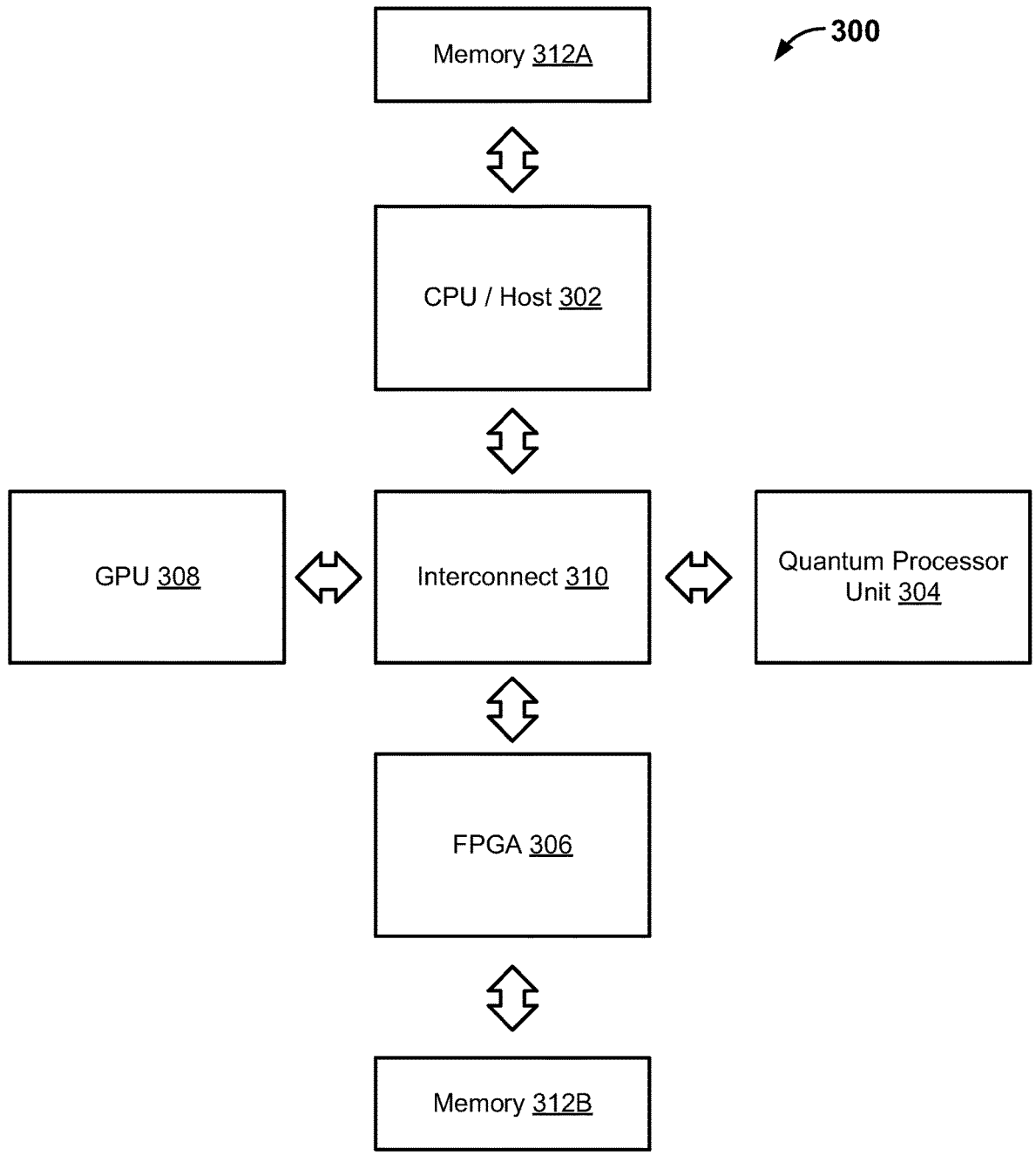
FIG. 3A is a block diagram of an example heterogeneous computing environment.

In some implementations, high-performance heterogeneous computing architectures combine a quantum processor with one or more classical computing device types. In some instances, such heterogeneous quantum computing architectures enable the construction of high performance computing systems that leverage the processing power of quantum supercomputing. The computing architecture may combine different instruction sets. For instance, FIG. 3A shows an example implementation of a heterogeneous computing architecture, which combines a quantum processor unit (QPU) with a central processing unit (CPU), a graphics processing unit (GPU), and a field programmable gate array (FPGA). In some implementations, a heterogeneous supercomputing system includes a quantum processor unit and multiple other distinct types of computing modules, such as, for example, FPGAs, GPUs, CPUs, application-specific integrated circuits (ASICs), systems-on-chip (SoCs) or other processor devices.

In some implementations, a quantum computer control system includes an embedded classical processor (e.g., a GPU or multiprocessor accelerator) that performs classical information processing tasks. The classical processor can be used to improve or optimize operation of the quantum processor. In some instances, the classical processor (e.g., the GPU or multiprocessor) carries out a simulation or emulation of the quantum processor cell or subsystem thereof. In some cases, the embedded classical processor within the heterogeneous control system can be used to for other purposes, for instance, to interpret results of quantum computations, etc.

Figure 1:
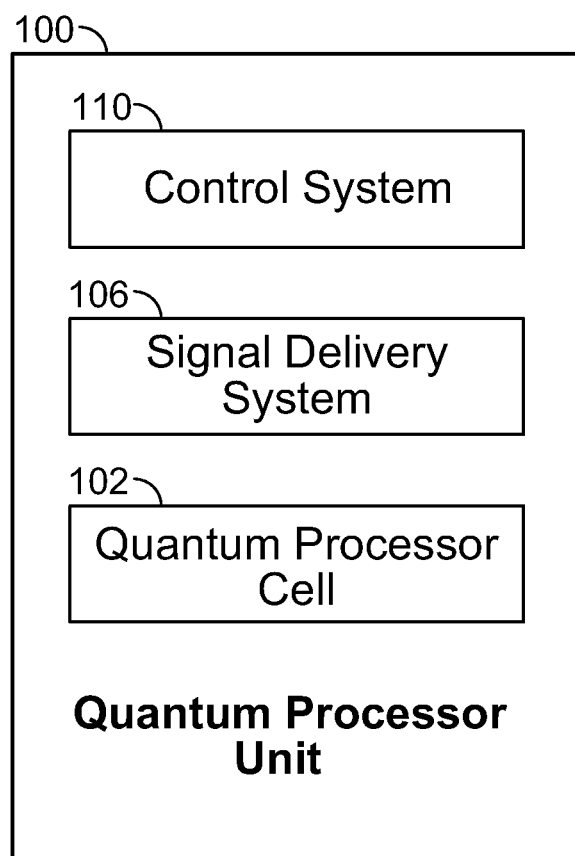
FIG. 1 is a schematic diagram of an example quantum computing system.

FIG. 1 is a schematic diagram of an example quantum processor unit 100. The example quantum processor unit 100 shown in FIG. 1 includes a control system 110, a signal delivery system 106, and a quantum processor cell 102. The example quantum processor unit 100 can be of the type described in PCT App. No. PCT/US2015/018126, filed Feb. 27, 2015, entitled "Housing Qubit Devices in an Electromagnetic Waveguide System," which is hereby incorporated by reference, or another type of quantum processor unit may be used. The example quantum processor unit 100 can include features of the example quantum computing system 200 shown in FIG. 2, or the example quantum processor unit 100 can be implemented in another manner. A quantum processor unit may include additional or different features, and the components of a quantum processor unit may operate as described with respect to FIG. 1 or in another manner.

The example quantum processor unit 100 shown in FIG. 1 can perform quantum computational tasks and algorithms. In some implementations, the quantum processor unit 100 can perform quantum computation by storing and manipulating information within individual quantum states of a composite quantum system. For example, qubits (i.e., quantum bits) can be stored in and represented by an effective two-level sub-space of a quantum coherent physical system. The formation of composite systems for quantum computing can be achieved by couplings between the individual physical qubits, for example, to perform conditional quantum logic operations. In some instances, the couplings between physical qubits can be rendered in a manner that allows large-scale entanglement within the quantum computing device. Control signals can manipulate the quantum states of individual qubits and the couplings between qubits. In some instances, information can be read out from the composite quantum system by measuring the quantum states of the individual qubits.

In some implementations, the quantum processor unit 100 can operate in a fault-tolerant regime. For example, fault-tolerance may be achieved through the use of carefully engineered dissipation and redundant encodings. In some example gate-based models for quantum computing, fault-tolerance can be achieved by applying a set of high-fidelity control and measurement operations to the qubits. For example, topological quantum error correction schemes can operate on a lattice of nearest-neighbor-coupled qubits. In some instances, these and other types of quantum error correcting schemes can be adapted for a two- or three-dimensional lattice of nearest-neighbor-coupled qubits, for example, to achieve fault-tolerant quantum computation.

In some implementations, the quantum processor unit 100 is constructed and operated according to a scalable quantum computing architecture. For example, in some cases, the architecture can be scaled to a large number of qubits to achieve large-scale general purpose coherent quantum computing. In some instances, the architecture is adaptable and can incorporate a variety of modes for each technical component. For example, the architecture can be adapted to incorporate different types of qubit devices, coupler devices, readout devices, signaling devices, etc. In some cases, the architecture of the quantum processor unit 100 provides a practicable and economical solution for large-scale quantum computation.

The example quantum processor cell 102 shown in FIG. 1 includes qubits that are used to store and process quantum information. For example, the quantum processor cell 102 may include solid state qubit devices realized from individual atoms or ions, individual electron or nuclear spins, charge- or spin-based quantum dots, superconducting quantum circuits based on Josephson junctions, impurities and defects in diamond or silicon carbide, or other types of systems. In some instances, all or part of the quantum processor cell 102 functions as a quantum processor, a quantum memory, or another type of subsystem. In some cases, the quantum processor cell 102 includes a signaling subsystem, qubit devices, coupler devices, and possibly other types of components or subsystems.

In the example quantum processor cell 102, the qubits each store a single bit of quantum information, and the qubits can collectively define the computational state of a quantum processor or quantum memory. The quantum processor cell 102 may also include readout devices that selectively interact with the qubits to detect their quantum states. For example, the readout devices may generate readout signals that indicate the computational state of the quantum processor or quantum memory. The quantum processor cell 102 may also include couplers that selectively operate on pairs of qubits and allow quantum interactions between the qubits. For example, the couplers may produce entanglement or other multi-qubit states over two or more qubits in the quantum processor cell 102.

In some implementations, the example quantum processor cell 102 can process the quantum information stored in the qubits by applying control signals to the qubits or to the couplers housed in the quantum processor cell. The control signals can be configured to encode information in the qubits, to process the information by performing logical gates or other types of operations, or to extract information from the qubits. In some examples, the operations can be expressed as single-qubit gates, two-qubit gates, or other types of logical gates that operate on one or more qubits. A sequence of operations can be applied to the qubits to perform a quantum algorithm. The quantum algorithm may correspond to a computational task, a quantum error correction procedure, a quantum state distillation procedure, or a combination of these and other types of operations. The quantum processor cell 102 may output information indicating the states of the qubits, for example, by applying control signals to the readout devices.

In the example shown in FIG. 1, the signal delivery system 106 provides communication between the control system 110 and the quantum processor cell 102. For example, the signal delivery system 106 can receive control signals (e.g., qubit control signals, readout control signals, coupler control signals, etc.) from the control system 110 and deliver the control signals to the quantum processor cell 102. In some instances, the signal delivery system 106 performs preprocessing, signal conditioning, or other operations to the control signals before delivering them to the quantum processor cell 102. In some instances, the signal delivery system 106 receives qubit readout signals from the quantum processor cell and delivers the qubit readout signals to the control system 110. In some instances, the signal delivery system 106 performs preprocessing, signal conditioning or other operations on the readout signals before delivering them to the control system 110. In some implementations, the signal delivery system 106 includes include input and output processing hardware, input and output connections, and other components. The input and processing hardware may include, for example, filters, attenuators, directional couplers, multiplexers, diplexers, bias components, signal channels, isolators, amplifiers, power dividers and other types of components.

In some implementations, the signal delivery system 106 and the quantum processor cell 102 are maintained in a controlled QPC environment. The QPC environment can be provided, for example, by shielding equipment, cryogenic equipment, and other types of environmental control systems. In some examples, the components in the QPC environment operate in a cryogenic temperature regime and are subject to very low electromagnetic and thermal noise. For example, magnetic shielding can be used to shield the system components from stray magnetic fields, optical shielding can be used to shield the system components from optical noise, thermal shielding and cryogenic equipment can be used to maintain the system components at controlled temperature, etc. The levels and types of noise that are tolerated or controlled in the QPC environment can vary, for example, based on the features and operational requirements of the quantum processor cell 102 and the signal delivery system 106.

In the example quantum processor unit 100 shown in FIG. 1, the control system 110 controls operation of the quantum processor cell 102. The example control system 110 may include data processors, signal generators, interface components and other types of systems or subsystems. In some cases, the control system 110 includes one or more classical computers or classical computing components.

In some implementations, the control system 110 includes a signal generator system, a program interface, a signal processor system or a combination of these and other systems and components. In some examples, components of the control system 110 operate in a room temperature regime, an intermediate temperature regime, or both. For example, the control system 110 can be configured to operate at much higher temperatures and be subject to much higher levels of noise than are present in the QPC environment. In some examples, the quantum processor unit 100 includes the control system connector hardware that is configured to isolate the components in the QPC environment from noise in the environment of the control system 110.

In some implementations, the control system 110 includes a signal generator that generates control signals from control information provided by a program interface. For example, the signal generator system may include a microwave signal generator, a DC control source, or other types of components that generate control signals. The control signals can be delivered to the quantum processor cell 102 by the signal delivery system 106.

In some implementations, the control system 110 includes a program interface that provides control information to the signal generator system. For example, the program interface can include a classical computing cluster, servers, databases, networks, or other types of classical computing equipment. In some instances, the program interface includes one or more microprocessors running software, monitors or other display apparatus, interface devices, and other types of classical computing components. The program interface can generate control information, for example, based on a quantum task or a quantum algorithm to be performed by the quantum processor unit 100, based on qubit readout information, or based on a combination of these and other types of information.

In some implementations, the control system 110 includes a signal processor system that can receive and process qubit readout signals from the quantum processor cell 102. For example, the signal processor system can include a digitizer, a microwave source, and other types of signal processing components. In some examples, the qubit readout signals can be delivered to the signal processor system by the signal delivery system 106. The signal processor system can process (e.g., digitize, or otherwise process) the qubit readout signals and provide the processed information to the program interface. The program interface can extract qubit readout data, for example, to identify the quantum states of qubits in the quantum processor cell 102.

In some instances, the quantum processor unit 100 operates based on a clock cycle or another type of synchronization scheme. For example, a quantum algorithm or quantum processing task may be expressed as a sequence of instructions corresponding to quantum gates, readouts, or other operations on the qubit devices, and a subset of the instructions can be executed on each clock cycle. In some instances, on each clock cycle, the control system 110 generates control signals to implement a subset of instructions, control signals are delivered to the quantum processor cell 102, and qubit readout signals are delivered to the control system 110. The control signals delivered on each clock cycle can be configured, for example, based on the sequence of instructions, based on readout signals from a previous cycle, quantum error correction operations, error matching calculations, other information, or a combination of these.

Figure 2:
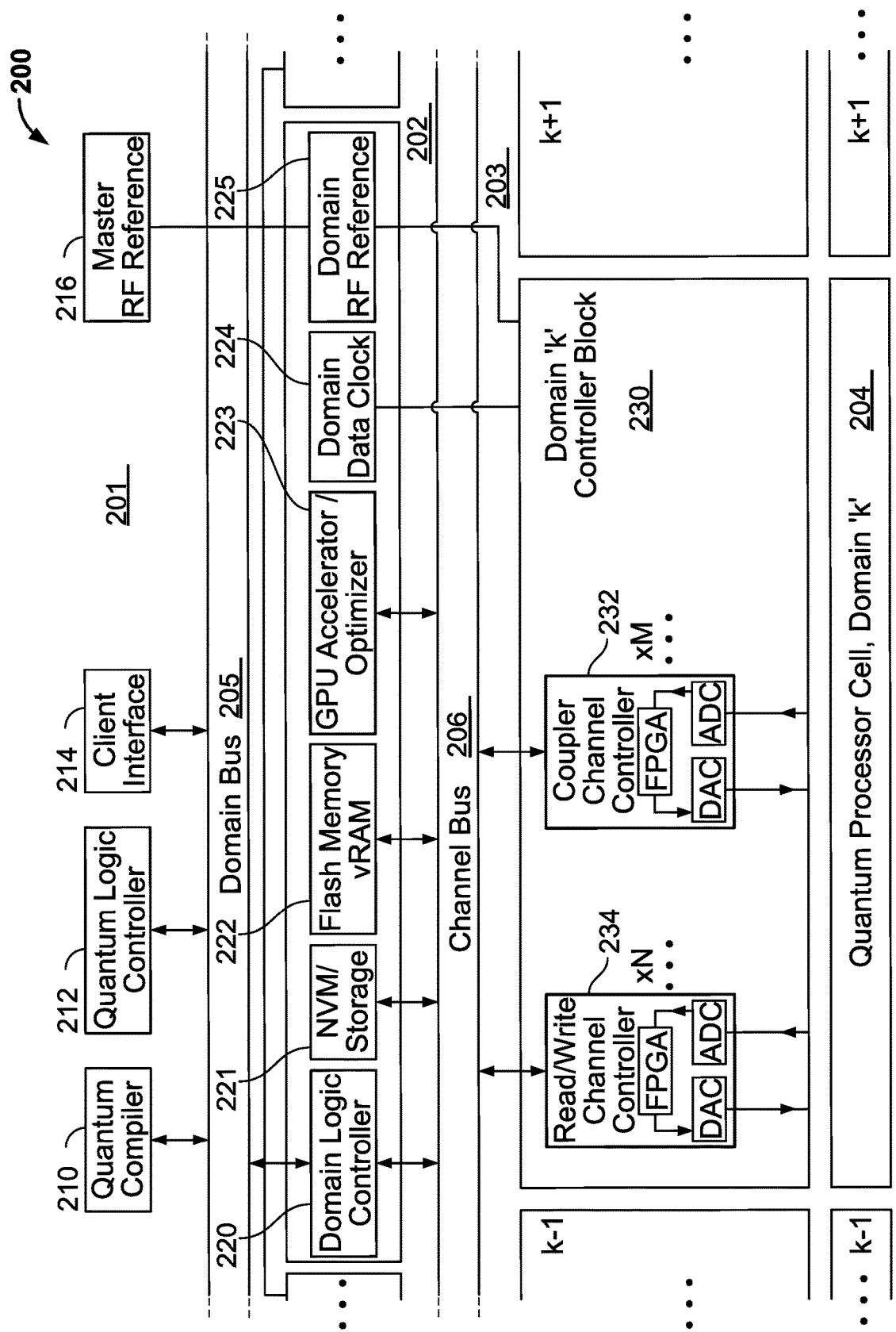
FIG. 2 is a block diagram of an example quantum computing system.

FIG. 2 is a block diagram of an example quantum computing system 200. In some instances, one or more components of the quantum computing system 200 may operate according to the example techniques shown and described with respect to one or more of FIG. 1, 3 or 4, or the quantum computing system 200 may operate in another manner. The example quantum computing system 200 shown in FIG. 2 includes multiple operating domains and multiple operating levels. The operating domains each include a subset of the qubits in a quantum processor cell, and each operating domain may include dedicated hardware at one or more of the operating levels of the quantum computing system 200. In some cases, multiple operating domains share resources at one or more of the operating levels.

In the example shown, the quantum computing system 200 includes a system control level 201, which is the highest operating level in the quantum computing system. The quantum computing system 200 also includes a domain control level 202, which is the second-highest operating level in the system. Below the domain control level 202, the quantum computing system 200 includes a channel control level 203. The quantum computing system 200 also includes a quantum processor cell level, which is the lowest level in the system. The quantum processor cell level includes quantum processor cell domains 204 for the operating domains of the quantum computing system 200.

The example system control level 201 shown in FIG. 2 includes a quantum compiler 210, a quantum logic controller (QLC) 212, a client interface 214, a master RF reference 216 and a domain bus 205. As shown in FIG. 2, the quantum compiler 210, the QLC 212 and the client interface 214 communicate with each other by exchanging signals on the domain bus 205. In some instances, the quantum compiler 210, the QLC 212 and the client interface 214 operate together, for example, to perform one or more operations of a program interface or other operations. The system control level 201 may include additional or different components, and the components of a system control level may operate in the manner described with respect to FIG. 2 or in another manner.

The example domain control level 202 includes a domain logic controller (DLC) 220, a non-volatile memory (NVM)/storage 221, a video random access memory (vRAM) 222 (e.g., a flash memory), a graphics processing unit accelerator/optimizer (GPU-AO) 223, a domain data clock 224 and a domain RF reference 225. In some cases, the domain control level 202 includes a set of such components, and possibly other components, for each operating domain of the quantum computing system 200. In some instances, components in the domain control level 202 perform one or more operations of a control interface, one or more operations of a program interface, or other operations. The domain control level 202 may include additional or different components, and the components of a domain control level may operate in the manner described with respect to FIG. 2 or in another manner.

As shown in FIG. 2, the domain RF reference 225 in the domain control level 202 communicates with the master RF reference 216. Also as shown in FIG. 2, the NVM 221, the vRAM 222, and the GPU-AO 223 communicate with each other by exchanging signals on the channel bus 206. The example buses shown in FIG. 2 (e.g., the domain bus 205, the channel bus 206) can be implemented, for example, as high-speed serial computer expansion buses (e.g., a PCIe (Peripheral Component Interconnect Express)), or other types of bus devices.

The example channel control level 203 includes multiple domain controller blocks 230. Each domain controller block 230 includes one or more channel controllers. The channel controllers in the domain controller block 230 may operate, for example, as the example channel controller 2361 shown in FIG. 23B, or the channel controllers may operate in another manner. In the example shown in FIG. 2, the domain controller block 230 includes one or more read/write channel controllers 234 and one or more coupler channel controllers 232. The example read/write channel controller 234 shown includes an FPGA, an ADC and a DAC; a read/write channel controller may be implemented using other types of devices or components (e.g., ASIC devices). Similarly, the example coupler channel controller 232 shown includes an FPGA, an ADC and a DAC; and a coupler channel controller may be implemented using other types of devices or components (e.g., ASIC devices). In some cases, the FPGA/DAC/ADC loop in the controllers can use the JESD204B serial standard or another type of serial communication protocol. In some instances, components in the channel control level 203 perform one or more operations of a signal generator system, or other operations.

The example read/write channel controller 234 can control the read and write operations for a group of qubit devices in the quantum processor cell domain 204. The quantum processor cell domain 204 may include a group of devices, where each device in the group belongs to a different sub-array; or the quantum processor cell domain 204 may include groups of another type. Similarly, the example coupler channel controller 232 can control the coupler operations for a group of coupler devices in the quantum processor cell domain 204. The read/write channel controller 234 and the coupler channel controller 232 can communicate with each other by exchanging signals on the channel bus 206. In some instances, the read/write channel controller 234 and the coupler channel controller 232 can communicate with components in the domain control level 202 by exchanging signals on the channel bus 206. As shown in FIG. 2, the domain controller block 230 can also communicate with (e.g., receive clock signals from) the domain data clock 224 and the domain RF reference 225.

The quantum processor cell domain 204 includes qubit devices, readout devices and coupler devices that are controlled by control signals from the domain controller block 230. The readout devices may also send qubit readout signals to the domain controller block 230. The qubit devices, readout devices and coupler devices can be housed, for example, in an electromagnetic waveguide system or another structure.

The example quantum computing system 200 can be assembled and deployed in an appropriate operating environment. For superconducting systems, the operating environment can include a cryogenic, low-noise environment where the ambient level of background noise is reduced or minimized at frequencies relevant to operation of the quantum processor cell. For example, a quantum processor cell with qubit devices and readout devices operating in the range of 3 GHz to 8 GHz maybe be deployed in an environment between 5 mK and 10 mK. In some cases, a quantum processor cell can be deployed at other temperatures (higher or lower). The temperature range can be guided, for example, by the formula $f=k_BT/h$, where f indicates the frequency of background noise, $k_B$ represents the Boltzmann constant, T represents temperature in units of Kelvin, and h represents Planck's constant. In some cases, the temperature range for one or more components of the quantum processor cell can be guided by other considerations or formulas. Moreover, in some cases, one or more levels or components of the quantum computing system 200 operate in higher temperature stages.

In some cases, signals are transferred between components of the quantum computing system 200 on transmission lines or other types of signal lines. For example, liquid crystal polymer substrates or other types of materials can be used to fabricate high-density, high-isolation, many-channel microwave signal cables. The example quantum computing system 200 shown in FIG. 2 includes signal lines that transfer signals between high and low temperature stages. In some instances, the signal lines extending from high to low temperature stages in a cryogenic apparatus can introduce a thermal shunt. Moreover, the cooling power at 10 mK may be less than 5 μW, and the signal delivery can be performed in architecture with hundreds, thousands or more qubit devices. To reduce the thermal bridging effects of transmission lines carrying DC, radio frequency, or microwave signals, a single transmission line may be used in some instances to deliver signals to multiple devices. In some cases, the signal line connects with a solid state switch, a switched filter bank, a power divider, a frequency multiplexer, or another device in the low temperature stage, and each input signal line bridging the temperature stage may divide into multiple signal distribution branches in the lower temperature stage, for example, to communicate with multiple devices.

In some instances, after the quantum computing system 200 has been deployed, the system is characterized. For example, operating frequencies of the devices (qubit devices, coupler devices, readout devices) in the quantum processor cell, anharmonicities, power levels, and other parameters of the system can be determined. The system device parameters can be determined, for example, by a characterization process that operates over frequency, power, and time ranges that are broader than the operational ranges used for quantum computation. Thus, the quantum computing system 200 may have broad operating capabilities. In some instances, s-parameters, input impedances, directional coupler outputs, and phase characteristics can be used in connection with identifying system parameters during the characterization process.

In some instances, after the system parameters have been determined by the characterization process, real-time control over the quantum processor cell components can be established. In some cases, this includes generating, delivering, applying, extracting and processing signals in connection with the devices in the quantum processor cell domain 204. The processed signals can be interpreted and used to condition subsequent input pulses, and this process can occur, for example, within a clock cycle of the quantum processor. For instance, a clock cycle can be the time between application of successive quantum logic gates during a quantum computation task. During real-time control, the device parameters and operating frequencies can be identified (e.g., periodically or continuously checked), for example, to account for sources of signal drift (e.g., aging, changes in thermal equilibrium, others).

In some instances, after establishing real-time control of the quantum processor cell, a quantum computing algorithm may be executed. The logical gates and readout operations that realize the quantum computing algorithm may be interwoven with additional overhead operations that are used to maintain the integrity of the stored quantum information. For example, quantum error correction procedures may be implemented to maintain computational integrity. The quantum computing algorithm and the quantum error correction procedures can be managed by the QLC 212. For example, the QLC 212 can provide instructions for individual channels and orchestrate real-time control on each individual channel across the full quantum processor cell. The QLC 212 can receive, process and send information to the subsystems of the quantum computing system 200, for example, to execute real-time control of the system.

In some instances, the real-time control of the quantum processor cell can be used as a computational resource. For instance, the quantum computing system 200 may communicate with an external device that is used to orchestrate recompiling and partitioning of the calculations to be performed across multiple processing nodes based on disparate underlying hardware or computing paradigms. As an example, the quantum computing system 200 can be deployed in a heterogeneous computing environment, for instance, as the quantum processor unit (QPU) 304 shown in FIG. 3A or as one or more of the processor devices shown in FIG. 4. In such cases, the quantum computing system 200 can receive instruction sets or commands and send responses or other data to a host in the heterogeneous computing environment (e.g., the CPU 302 shown in FIG. 3A, the host 402 shown in FIG. 4, or another type of host).

In the example shown in FIG. 2, the client interface 214 communicates with the QLC 212 and the quantum compiler 210. In some instances, an application that communicates with the client interface 214 can be a local application or a remote application that communicates, for example, over a data network (e.g., the Internet, cellular telecommunication infrastructure, a virtual private network, etc.) or another type of communication channel. In some cases, the client interface 214 specifically targets the application to be run on the quantum computing system 200. In some cases, an external system targets the application to be run on the quantum computing system 200, and the client interface 214 does not target applications. For example, the quantum computing system 200 may act as a node or an obfuscated accelerator for a particular task to be performed in a larger system.

The example quantum compiler 210 can interpret data and instructions from the client interface 214 and compile them into a series of quantum logic gates to realize a computational task. In the example shown, the QLC 212 can control the execution of the quantum computation on the quantum processor cell. For instance, the QLC 212 can communicate with multiple DLCs 220, and each DLC 220 can orchestrate the operation of an individual operating domain. For example, each DLC 220 can be mapped to and responsible for a physical region of the quantum processor cell (e.g., a subset of a full lattice of qubit devices and coupler devices, or another type of physical region).

The example QLC 212 may receive measurement data and error-matching calculations performed at the domain control level 202. The example QLC 212 can send each DLC 220 instructions for the application of time-sequenced or frequency-multiplexed quantum logic or other operations (e.g., single-qubit gates, multi-qubit gates, subroutines, a characterization process, an optimization protocol, measurements, etc.). The QLC 212 may receive calculation results from error-correction calculations across all operating domains; in some implementations, such calculations at the domain control level 202 are restricted to errors within a respective operating domain.

The example master RF reference 216 in the system control level 201 can function as a master clock that generates a master clock signal. In some cases, the master clock signal can be distributed for timing and synchronization to each domain in the control system.

In the domain control level 202, the DLC 220 communicates with the system control level 201, for example, receiving system-level control instructions in the form of time-sequenced quantum logic operations. The example DLC 220 can be responsible for both execution of quantum logic operations and other types of operations (e.g., characterization, testing, optimization, etc.) in a given operating domain. The example DLC 220 may instruct one or more channels under its operating domain to operate in either a real-time computing mode or an off-line characterization and testing mode. In some cases, the operating mode of each channel is independent of the other channels in the quantum computing system 200.

In some implementations, the DLC 220 can be implemented as a single- or multi-core processor; as an FPGA or ASIC; or a combination of these and other systems, which may be locally or remotely located. In some cases, for example, when the processing, memory or storage demands on the DLC 220 are significant, the DLC 220 may be supplemented on the domain control level 202 with a memory resource such as the vRAM 222, the GPU-AO 223, or another resource. For example, the vRAM 222 or the GPU-AO 223 can be used to support error correcting calculations, optimization of individual qubit or coupler channels, or other operations. The domain control level 202 may include a solid state or other storage resource. The master clock signal from the system control level 201 can be distributed to each domain in the domain control level 202, and the domain data clock 224 within each domain can produce a domain clock signal for synchronizing individual channel controllers in the channel control level 203.

In some instances, one or more of the components shown in FIG. 2 provides additional processing power beyond what is utilized by the quantum processor cell domain to which it is deployed. The additional processing power can serve as a processing node in a heterogeneous computing environment, such as, for example, the heterogeneous computing environments 300, 400 shown in FIGS. 3 and 4, respectively. In some cases, additional processing nodes may be implemented based on a field-programmable gate array (FPGA), a graphics processing unit (GPU), an application-specific integrated circuit (ASIC), a system-on-a-chip (SOC), a single- or multi-core central processing unit (CPU)-based processor, or another type of data processor. As an example, the GPU-AO 223 may operate as the GPU 308 shown in FIG. 3A while the quantum computing system 200 operates as the QPU 304 shown in FIG. 3A; the GPU-AO 223 may operate as one of the computing devices 408 shown in FIG. 4 while the quantum computing system 200 operates as the QPU 404 shown in FIG. 4; or the GPU-AO 223 may be deployed in another type of heterogeneous computing environment that leverages the coherent quantum resources of the quantum computing system 200.

In the example channel control level 203, individual channel controllers are deployed. The read/write channel controller 234 can be used for read/write control (e.g., measurement and operation) of qubit devices in the quantum processor cell. The coupler channel controller 232 can be used for operation of coupler devices in the quantum processor cell. In some cases, the architecture of both types of channel controllers can be the same. In some cases, the read/write channel controller 234 can have physical attributes or performance specifications that are distinct from the attributes or specifications of the coupler channel controller 232. For example, the read/write channel controller 234 may receive source signals having components in the range of 3 GHz to 5 GHz for control of qubit devices, and the range of 5 GHz to 7 GHz for control of readout devices, and the coupler control channel 232 may receive source signals in the range of DC (zero frequency) to 1 GHz for control of coupler devices. Other frequency ranges may be used in various implementations.

In some instances, the FPGA of each channel controller is in real-time communication with the DLC 220. At each clock cycle, the FPGA in some or all of the channel controllers in the domain controller block 230 can communicate to the DLC 220 a status or measurement outcome, and can receive from the DLC 220 instruction for subsequent execution. The FPGA may receive the instructions from the DLC 220 and induce the DAC and ADC within the channel controller to produce or process signals that allow the system to perform quantum computation operations realizing those instructions. In some cases, the FPGA can implement Kalman filter digital signal processing techniques or other types of processes to optimize or otherwise improve the interpretation of qubit readout signals.

In some implementations, the quantum logic controller 212 operates as a program/routine invoker. Hardware instructions can be written from the quantum logic controller 212 to all domain logic controllers 220, which can all be all synced to same master RF reference 216. The domain logic controllers 220 can include, for instance, a hybrid memory cube or similar fast hardware memory and a logic chip to distribute synced trigger pulses. The domain logic controllers 220 can trigger all lower level domain controller blocks 232, 234 (which include the FPGA/DAC/ADC loops in the example shown) and extract data from each to send back to the quantum logic controller. The domain controller blocks 232, 234 can define output pulses for the DAC (e.g., using a lookup table or another technique). The ADC can contain an internal numerically-controlled oscillator to down-convert the digitized information and directly output IQ information to the FPGA. The IQ information can be used, for example, to determine the next DAC output waveform based on logic rules stored in the FPGA. When the specified measurement result is computed by the FPGA, it can be passed back up to the domain logic controller 220, which can make decisions (e.g., at hardware latency speeds) based on the program provided by the quantum logic controller 212.

FIG. 3A is a block diagram of an example heterogeneous computing environment 300. The example heterogeneous computing environment 300 shown in FIG. 3A includes four distinct types of processors: a Central Processing Unit (CPU) 302, a Quantum Processor Unit (QPU) 304, a Field Programmable Gate Array (FPGA) 306, and a Graphics Processing Unit (GPU) 308. The heterogeneous computing environment 300 may include additional or different types of processors, and may include one or more of each type of processor shown.

In the example shown in FIG. 3A, the CPU 302, the QPU 304, the FPGA 306 and the GPU 308 are connected to an interconnect 310. The processors may be connected to additional or different devices and systems. For instance, each processor may be connected to a dedicated memory device. In the example shown, the example CPU is connected to memory 312A, and the example FPGA 306 is connected to memory 312B. In some implementations, one or more hybrid memory cubes can be used; such devices may provide improvements in power consumption, speed, and other aspects of performance. In some cases, the CPU 302, the QPU 304, the FPGA 306 and the GPU 308 communicate with one another using the JESD204B serial standard or another type of serial communication protocol. Additional or different memory devices and other types of components may be included in the heterogeneous computing environment 300.

In the example shown in FIG. 3A, the CPU 302 operates as a host device that can control operation of the other processors in the heterogeneous computing environment 300. In some implementations, another type of processor acts as a host device that controls operation of one or more other processors. In some cases, the host device (e.g., the CPU 302) can operate as a master device that delegates processing tasks to the other processors and controls timing and dataflow in the heterogeneous computing environment 300. For example, the CPU 302 can identify a particular type of processor device to execute each sub-process in an algorithm; and based on the type of processor device identified, the CPU 302 can delegate the sub-processes the QPU 304, the FPGA 306 or the GPU 308, or the CPU 302 or execute the sub-process itself.

In some implementations, host device (e.g., the CPU 302) can include any type of data processing hardware device that can control operation of the heterogeneous computing environment 300. In some instances, the host device is a general purpose microprocessor that can run applications and programs by executing or interpreting software, scripts, functions, executables, and other types of computer program code. In some cases, the host device is programmed to control operation of a computing system (e.g., a server, a server cluster, a desktop computer, etc.), for instance, by executing an operating system, a virtual machine, or another type of computing system platform. In some cases, a computing system can include multiple host devices.

In some cases, the CPU 302 can be implemented on a dedicated chip or chipset, or it can be integrated with other devices on a shared chip. In some implementations, the CPU 302 can be or include a single-core processor, a multi-core processor that includes multiple processing units, or one or more commercially-available products. These example CPUs, or other types of CPUs, can be connected to the interconnect 310 and configured to communicate with the other processors in the example heterogeneous computing environment 300.

The example interconnect 310 shown in FIG. 3A includes one or more hardware connections among the processor devices in the heterogeneous computing environment 300. The interconnect 310 can be implemented as a digital data path between devices. For example, the interconnect 310 can include, for example, PCIe switches, 10 or 100 Gigabit Ethernets, or a combination of these and other types of connections. In some implementations, the interconnect 310 can include a shared memory system. For example, the interconnect 310 may include memory blocks or memory devices that are accessible by multiple processor devices. For instance, the interconnect 310 can include a memory block that is shared by the CPU 302 and the QPU 304, where both the CPU 302 and the QPU 304 have read and write access to the shared memory block. The same memory block may be shared by other processor devices (e.g., the FPGA 306, the GPU 308, or both), or each pair of processor devices may share a distinct memory block. For instance, the interconnect 310 can include another memory block that is shared by the GPU 308 and the QPU 304, but not by the CPU 302 or the FPGA 306. The interconnect 310 can include other types of digital data paths.

In the example shown, the CPU 302 can access information on the memory 312A and store information to the memory 312A, and the CPU 302 may invoke the other processors to performed specialized functions. In some instances, the CPU 302 may interact with a user interface, a communication interface, or other types of devices to receive input or instructions. The CPU 302 can operate as a master component that invokes, calls, or otherwise controls the operation of the QPU 304, the FPGA 306, and the GPU 308. The heterogeneous computing environment 300 may include components or subsystems that operate autonomously or may be controlled by a different component, other than the CPU 302.

One or more of the processors in the heterogeneous computing environment 300 can operate as specialized processors that are configured to supplement functionality of the host device. For example, the specialized processors may be configured to provide computationally-intensive functionality when invoked by the host device. The specialized processors can include one or more co-processors or another type of data processing apparatus. For instance, the QPU 304, the FPGA 306, and the GPU 308 can be configured as co-processors that supplement functionality of the CPU 302. A co-processor can include hardware, firmware, or other features configured to execute a class of operations or a class of functions faster or otherwise more efficiently than the host device. The specialized processors can include multimedia co-processors, quantum co-processors, or a combination of these and other co-processors.

Operation of specialized processors (e.g., GPUs, QPUs, FPGAs, or other types) can be supervised or otherwise controlled by the host device. A specialized processor may be configured in a master-slave relationship with the host device, or in another type of relationship. In some cases, the host device can offload computationally-intensive tasks to the specialized processors, for example, to improve system performance, system utilization, or other factors. Offloading tasks to the specialized processors can allow the host device to perform other tasks in parallel, and in some cases the offloaded task can be performed faster or more efficiently by the specialized processors than by the host device. In some implementations, the specialized processors are programmed or configured to perform a more limited range of specialized tasks than the host device. Moreover, the specialized processors may have more limited control over other components of the heterogeneous computing environment 300, as compared to the host device. For example, specialized processors may have limited or no direct access to the memory 312A, operating systems, interfaces or other components.

In the example shown in FIG. 3A, the QPU 304 can include any type of data processing hardware device that can encode and process information in quantum states of light or matter. In some cases, QPUs can be configured to execute quantum algorithms that perform certain computational tasks more efficiently than other types of processors. Some QPUs can be configured to perform a Fourier transform, factor large integers (e.g., Shor's algorithm), simulate a quantum system, perform a search (e.g., Grover's algorithm), estimate quantum phases, or other types of computational tasks. In some examples, QPUs are configured to perform these and other types of operations by leveraging large-scale entanglement and other quantum resources.

In some examples, the QPU 304 includes qubit devices, coupler devices, readout devices, signaling devices and other types of components. In some instances, the QPU 304 can operate in a fault-tolerant regime, for instance, using quantum error correction and other control techniques. Control signals within the QPU 304 can be used to manipulate the quantum states of the qubits and to manipulate the couplings between qubits. Information can be read out from the qubits, for example, by performing projective measurement of the quantum states or by other measurement techniques. In some implementations, the QPU 304 may operate in another manner.

In some cases, a QPU can be implemented as independent data processing system that performs delegated computational tasks without invoking the CPU 302, the FPGA 306, or the GPU 308. In some cases, a QPU can be configured to leverage other processing devices, which may include the CPU 302, the FPGA 306, the GPU 308 or other processing devices in the heterogeneous computing environment 300. In some implementations, the QPU 304 can include one or more quantum processor units of the types described in FIGS. 1 and 2. These example QPUs, or other types of QPUs, can be connected to the interconnect 310 and configured to communicate with the other processors in the example heterogeneous computing environment 300.

In the example shown in FIG. 3A, the FPGA 306 can include any type of data processing hardware device that can be re-programmed at the hardware level, for instance, by modifying logic blocks or interconnects among logic blocks. FPGAs are often implemented as integrated circuits that include logic blocks and interconnects that can be re-configured to re-program the integrated circuit. The logic blocks can include multiple logic components such as, for example, flip-flops, lookup tables, combinational logic components, Boolean gates, and others. In some cases, the logic blocks include configurable logic blocks that can be re-configured to program the FPGA for a certain computational task, and the connections among the logic blocks can include programmable interconnects that can be re-configured to program the FPGA for a certain computational task.

In some cases, an FPGA can be implemented on a dedicated chip or chipset, or it can be integrated with other devices on a shared chip. In some implementations, the FPGA 306 can be or include one or more commercially-available products. These example FPGAs, or other types of FPGAs, can be connected to the interconnect 310 and configured to communicate with the other processors in the example heterogeneous computing environment 300.

In the example shown in FIG. 3A, the GPU 308 can include any type of data processing hardware that can perform operations related to graphics processing. GPUs are often implemented as integrated circuits configured to perform certain classes of operations related to graphics manipulation, image processing and other tasks. For instance, some example GPUs are configured for mapping 3-dimensional (3D) models to a 2-dimensional (2D) image for display. Examples of operations and processes that can be accelerated by some types of GPUs include motion compensation, inverse discrete cosine transformations and others. In some examples, GPUs are configured to perform these and other types of operations by leveraging highly parallel architectures that enable highly parallel processing.

In some cases, computational tasks can be re-formulated (e.g., by the host device) as a 3D rendering task or another type of task that the GPU 308 is configured to accelerate, and a graphics API (Application Programming Interface) or another type of interface can be used to delegate the re-formulated computational task to the GPU 308. In some cases, the GPU 308 can be configured as a General Purpose Graphics Processing Unit (GPGPU), and computational tasks can be delegated to the GPU 308 without re-formulating them. For instance, the GPU 308 can be deployed in a computing platform such as, for example, the "Compute Unified Device Architecture" (CUDA®) developed by NVIDIA®, and used for general purpose graphics processing. Other types of GPGPU architectures may be used.

In some cases, a GPU can be implemented on a dedicated chip or chipset, or it can be integrated with other devices on a shared chip. In some implementations, the GPU 308 can be or include one or more one or more commercially-available products. These example GPUs, or other types of GPUs, can be connected to the interconnect 310 and configured to communicate with the other processors in the example heterogeneous computing environment 300.

Figure 3B:
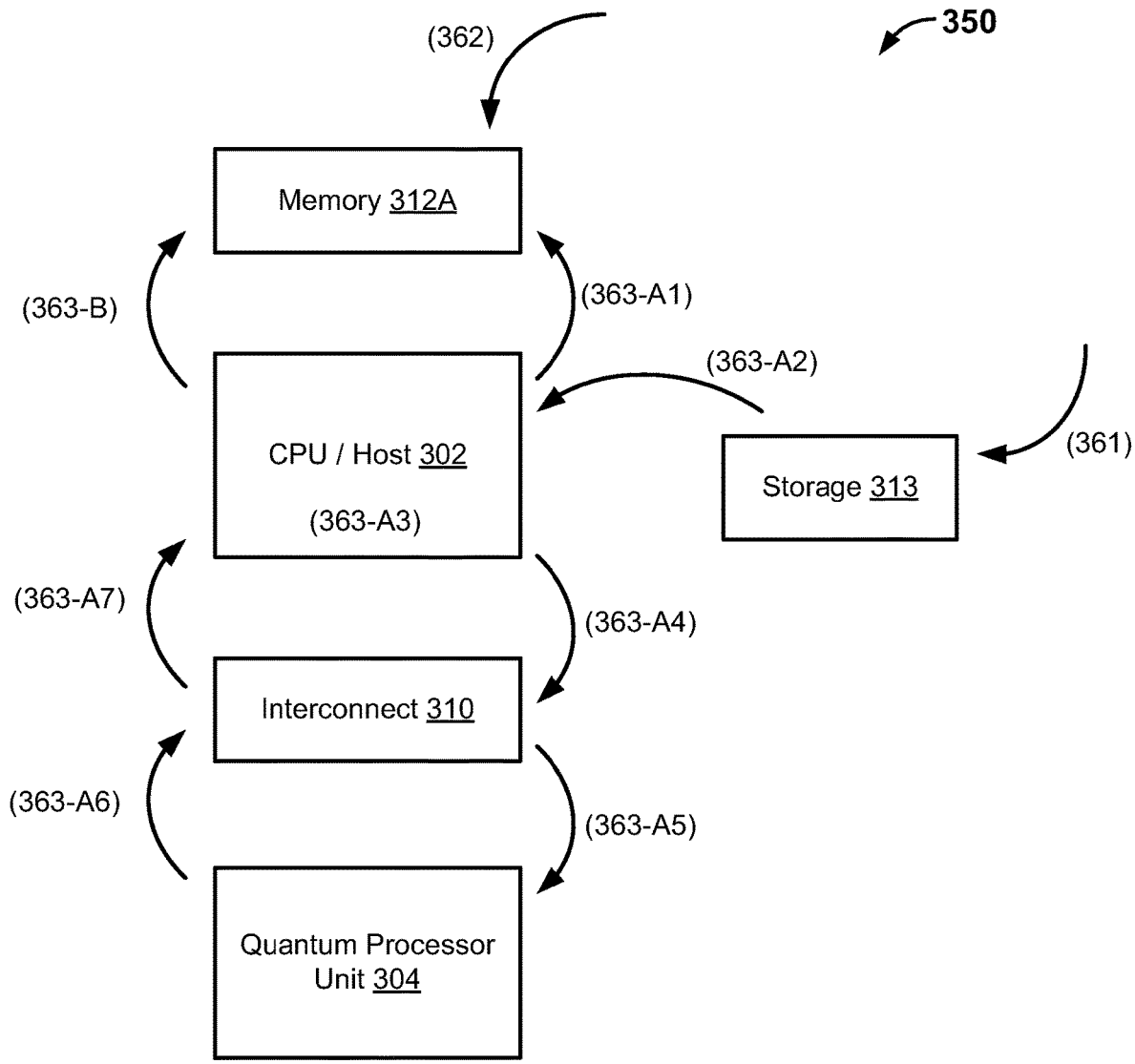
FIG. 3B is a block diagram showing an example data flow in a heterogeneous computing environment.

In some instances, the example heterogeneous computing environment 300 utilizes multiple distinct processor devices to execute an algorithm. For instance, some quantum algorithms utilize accompanying classical processing that can be implemented in a heterogeneous architecture. FIG. 3B shows an example where the QPU 304 and the CPU 302 are utilized in a training algorithm in which the QPU 304 performs gradient estimation by quantum sampling (GEQS). As another example, Shor's algorithm for prime factorization calls an order-finding subroutine that is performed by a QPU, while other data processing tasks in the algorithm can be performed classically (e.g., by a CPU, an ASIC, an FPGA, etc.).

In some examples, a classical processor can "boost" the effective size of the QPU 304. For instance, one or more classical processors can effectively add some number (k) of "virtual" qubits to the number (n) of qubits implemented by the QPU 304. As an example, in some cases, the CPU 302 can decompose a quantum circuit on n+k qubits into smaller circuits of size n, the QPU 304 can simulate these multiple smaller circuits, the QPU 304 can then compute interference terms between the smaller circuits, and the CPU 302 can post-process the results from the QPU 304 to obtain the output for the quantum circuit. This can make the QPU 304 able to process larger problems without an expansion of the quantum hardware, which may be limited for economic or engineering reasons in some contexts, while classical hardware can be commercially bought and added for relatively low overhead. Generally, direct classical simulation of the n+k system (e.g., on the CPU 302, without the QPU 304) would be less efficient (e.g., exponentially slower in some instances).

In some aspects of operation, the CPU 302 accesses a computer program to be executed in the heterogeneous computing environment 300. The computer program can include computer program code that defines variables and data processing tasks (e.g., functions, routines, etc.). The CPU 302 can store the variables and other data in the memory 312A while executing the computer program. For instance, the CPU 302 can read, write and manipulate values of the variables in the memory 312 based on the data processing tasks and other information in the computer program.

The computer program can be executed in the heterogeneous computing system by delegating data processing tasks to the various processor devices. The data processing tasks may be delegated in series, in parallel, or both, as specified by the computer program or other protocols. For instance, to delegate a data processing task to the QPU 304, the host device (the CPU 302 in the example shown in FIG. 3A) can generate instructions for the QPU based on the values of the variables stored in the memory 312A and possibly other information. The instructions generated by the host device are configured to cause the QPU 304 to perform a particular function or other data processing task defined in the computer program. The instructions are provided to the QPU 304 through the interconnect 310, and the QPU 304 performs the data processing task by executing the instructions generated by the host device. Output values generated by the QPU 304 can then be provided back to the host device through the interconnect 310. The host device can then update the values of the variables in the memory 312A based on the output values from the QPU 304. The updated values of the variables can be further processed by one or more of the classical processors (the CPU 302, the FPGA 306, the GPU 308). For instance, the host device may perform (or delegate to another classical processor device) additional data processing tasks based on the updated values.

In some cases, the CPU 302 iteratively generates instructions for the QPU 304, receives output from the QPU 304, and then processes the output by operation of one or more of the classical processors (the CPU 302, the FPGA 306, the GPU 308) in the heterogeneous computing environment 300. For instance, the computer program may include an iterative process in which the QPU 304 performs one or more specified computing tasks on each iteration, and one or more of the classical processors perform other computing tasks on each iteration. In such cases, the instructions sent to the QPU 304 depend on the output values generated by the one or more classical processors on the current iteration or a prior iteration. As an example, in FIG. 3B the computer program is configured to execute a training algorithm in an iterative fashion. On each iteration, the CPU 302 generates instructions for the GEQS algorithm to be executed by the QPU 304 based on the parameters stored in the memory 312A, and the CPU 302 updates the parameters based on the gradient or other output values generated by the QPU 304.

In some implementations, the host unit identifies the data processing tasks to be performed by each type of processor device. For example, the computer program code may indicate a type of processor for each data processing task in the computer program. In some cases, the host unit may have access to a library of functions that each processor device can perform. The host unit can delegate the computing tasks to the various processor device in series, in parallel, or otherwise, according to the computer program or another protocol.

In some examples, the computer program is executed by repeatedly executing data processing tasks on multiple respective processor devices. For instance, after a classical processor generates a first output of a first data processing task in the computer program, the host processor unit can generate a set of instructions for the QPU 304 based on the first output; the QPU 304 can then execute the set of instructions to generating a second output of a second data processing task in the computer program. The classical processor unit can then perform additional data processing tasks based on the second output. For instance, the first data processing task can be performed based on the second output. In some instances, the host processor unit is or includes the classical processor unit that performs the first data processing task. In some instances, the classical processor unit that performs the first data processing task is the GPU 308, the FPGA 306 or another classical co-processor, and the host processor device delegates the first data processing task by generating an instruction set for the classical co-processor. The instruction set can be transferred to the classical co-processor through the interconnect 310, and the output values from the classical co-processor can be transferred to the host processor device through the interconnect 310.

The computer program (which may also be called a program, script, or code) includes computer program code that can be written in any form of programming language, including compiled or interpreted languages, declarative or procedural languages, and it can be deployed in any form, including as a stand-alone program or as a module, component, subroutine, object, or other unit suitable for use in the heterogeneous computing environment 300. A computer program may, but need not, correspond to a file in a file system. A program can be stored in a portion of a file that holds other programs or data (e.g., one or more scripts stored in a document), in a single file dedicated to the program in question, or in multiple coordinated files (e.g., files that store one or more modules, sub-programs, or portions of code).

FIG. 3B is a block diagram showing an example data flow in a heterogeneous computing environment 350. The example data flow shown in FIG. 3B represents some of the operations in an example training algorithm that uses the QPU 304 to perform gradient estimation by quantum sampling (GEQS). In this example, a deep learning algorithm trains a Boltzmann machine. A Boltzmann Machine (BM) can be described as a graph where each node (or unit) is equipped with a parameter and each edge is equipped with a (coupling) parameter. The state of the BM is the set of all such parameters. A set of these units are designated as visible units, the rest are called hidden units. Boltzmann machine training can be performed through gradient descent in the parameter space of the BM to increase the likelihood that BM will replicate the training data's statistics on its visible units.

The example heterogeneous computing environment 350 shown in FIG. 3B includes two distinct types of processors: the CPU 302 and the QPU 304 from FIG. 3A. In some cases, the example data flow shown in FIG. 3B can utilize additional or different types of processors in the heterogeneous computing environment. In FIG. 3B, the CPU 302 operates as a host device that can delegate data processing operations to the QPU 304. Similar to FIG. 3A, the CPU 302 and the QPU 304 in FIG. 3B are connected to an interconnect 310, and the CPU 302 is connected to memory 312A. In addition, the CPU 302 shown in FIG. 3B is connected to an external storage 313. The processors may be connected to additional or different devices and systems.

In the example implementation represented in FIG. 3B, the training algorithm is executed using the external storage 313 to store a set of feature vectors that form the training data; using the classical memory 312A to store the state of the BM; and using the interconnect 310 to store the GEQS quantum program and its output. In the example shown, the interconnect 310 can include, for example, a classical memory on board the QPU or another type of shared memory. The training algorithm can be implemented using memory and interconnect components in another manner. For example, in some cases, the GEQS quantum program and its output are stored in another classical memory component (other than the interconnect 310), or the state of the BM can be stored in the interconnect 310 (rather than the memory 312A), etc.

In the example implementation represented in FIG. 3B, the training algorithm is executed using the CPU 302 for classical control, calculation, and parameter updates, and using the QPU 304 to perform the GEQS quantum algorithm step. The QPU 304 can include a control system (such as, for example, the control system 110 in FIG. 1) that processes instructions from the CPU 302 and causes the QPU 304 to run the GEQS algorithm according to the instructions.

In the example implementation represented in FIG. 3B, the training algorithm proceeds along the arrows labeled 361, 362 and 363. At 361, training data is loaded into the storage 313; and at 362, the BM state is initialized into the memory 312A. At 363, a number of operations are performed for each epoch, for example, until a convergence condition or another termination criterion is met. At 363-A1, temporary variables are allocated in the memory 312A; at 363-A2, a training vector is extracted from the storage 313; at 363-A3, a BM state and training vector are used to compile a GEQS algorithm; at 363-A4, a set of instructions for the QPU are sent to the interconnect 310; at 363-A5, the GEQS is executed by the QPU 304; at 363-A6, the result of the GEQS is stored in the interconnect 310; and at 363-A7, the CPU 302 uses the gradient values stored in the interconnect 310 to update temporary variables in the memory 312A. The operations 363-A1, -A2, -A3, -A4, -A5, -A6 and -A7 can be executed for each training vector. At 363-B, after all training vectors have been processed, the CPU 302 updates the BM in the memory 312A using stored variables. After completing the operations shown, the trained Boltzmann machine is not necessarily entirely stored in the memory 312A. In some cases, the Boltzmann machine can be further trained or used to generate predictions using conventional techniques.

In some implementations, use of the QPU 304 in executing the GEQS algorithm can provide multiple advantages. For example, the QPU 304 can give an exact gradient calculation, whereas known classical approaches are limited to approximate calculations. And in some cases, the QPU 304 can calculate the gradient for fully-connected Boltzmann machines, which are classically intractable at modest sizes (e.g. 50 units), but which are the most flexible learning models. In some instances, the GEQS algorithm can be implemented using other types of processor components.

In some implementations, use of the CPU 302 to control the training algorithm can provide multiple advantages. For example, running the whole training algorithm on a dedicated QPU of limited size may be impossible or would decrease efficiency in some cases, as the full training dataset would need to be loaded into a large quantum memory. As another example, the classical operations in the training steps do not necessarily benefit from a quantum speedup, and so these classical operations may be more economically implemented on classical hardware. In the example shown, the heterogeneous architecture allows the training data to be loaded serially into the QPU algorithm. Thus, the QPU 304 can operate using a smaller number of qubits, for instance, qubits of order the size of the BM, regardless of the size of the training data sets. The training data sets can be extremely large and, additionally, the added accuracy and flexibility of the QPU's training algorithm may decrease the size of the BM needed for accurate modelling.

Figure 4:
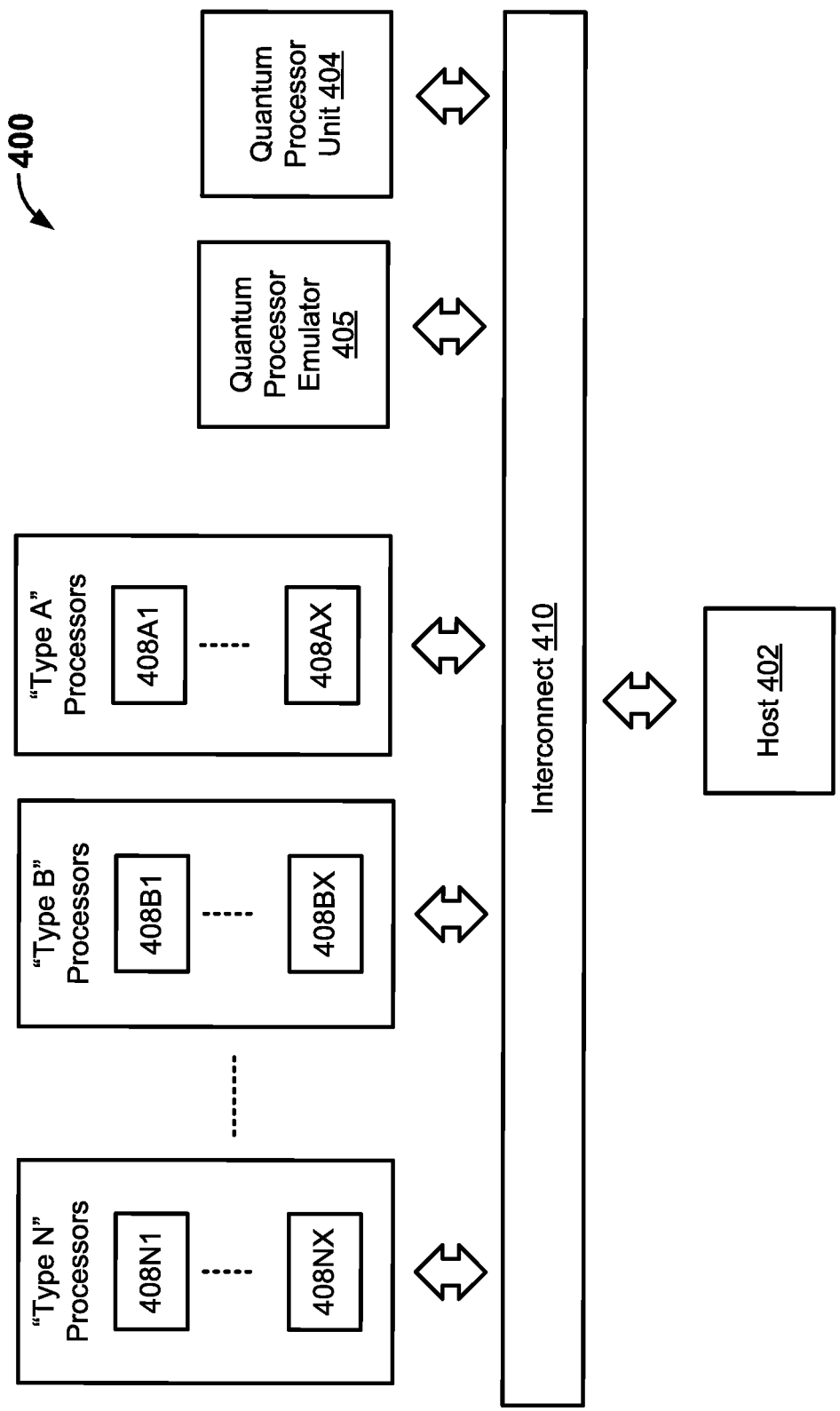
FIG. 4 is a block diagram of another example heterogeneous computing environment.

FIG. 4 is a block diagram of another example heterogeneous computing environment 400. The example heterogeneous computing environment 400 includes a host 402, a quantum processor unit 404, a quantum processor emulator 405, multiple processors 408 and an interconnect 410. In the example shown, the host 402, the quantum processor unit 404, the quantum processor emulator 405, and the processors 408 can communicate with each other via the interconnect 410 The heterogeneous computing environment 400 can include additional or different features, and the components can operate in the manner shown or in another manner.

The group of processors 408 shown in FIG. 4 includes multiple distinct types of processor devices, labeled "Type A," "Type B," and "Type N" in the FIG. 4, and the heterogeneous computing environment 400 can include one or more of each distinct type of processor. In the example shown, the heterogeneous computing environment 400 includes one or more "Type A" processors labeled 408A1 through 408AX, one or more "Type B" processors labeled 408B1 through 408BX, and one or more "Type N" processors labeled 408A1 through 408NX. In some cases, the different types of processors include field-programmable gate arrays (FPGAs), graphics processing units (GPUs), application-specific integrated circuits (ASICs), systems-on-a-chip (SOCs), single- or multi-core central processing unit (CPU)-based processors, or other types of data processor. As an example, the "Type A" processors (408A1 through 408AX) can be GPUs, the "Type B" devices (408B1 through 408BX) can be ASICs, and the "Type N" devices (408N1 through 408NX) can be FPGAs, SOCs or CPUs. In some cases, the heterogeneous computing environment 400 include fewer, different, or additional types of processors.

In the example shown in FIG. 4, the processors 408 can operate in the heterogeneous computing environment 400 in a manner that is similar to the operation the FPGA 306 or the GPU 308 in the heterogeneous computing environment 300 shown in FIG. 3A. For instance, the processors 408 can be connected to the interconnect 410 and configured to communicate with the other processors and devices in the heterogeneous computing environment 400.

In the example shown in FIG. 4, the host 402 can be, for example, a CPU-based processor or another type of processor. The host 402 can operate in the heterogeneous computing environment 400 in a manner that is similar to the operation the host in the heterogeneous computing environment 300 shown in FIG. 3A. For instance, the host 402 can be connected to the interconnect 410 and configured to communicate with the other processors in the heterogeneous computing environment 400.

In the example shown in FIG. 4, the QPU 404 can include any type of data processing hardware device that can encode and process information in quantum states of light or matter. For instance, the QPU 404 can include one or more quantum processor units of the types described in FIGS. 1, 2 and 3. The QPU 404 can operate in the heterogeneous computing environment 400 in a manner that is similar to the operation the QPU 304 in the heterogeneous computing environment 300 shown in FIG. 3A. For instance, the QPU 404 can be connected to the interconnect 410 and configured to communicate with the other processors in the heterogeneous computing environment 400.

The quantum processor emulator 405 can include, for example, a GPU-based quantum processor emulator or another type of computing system that emulates a quantum processor unit. In some implementations of a quantum processor emulator, one or more GPUs perform calculations on sub-spaces of the full vector space of a simulated quantum processor. Multiple GPUs can be used to increase the size of the simulated vector space, and the host 402 can orchestrate the simulation.

The interconnect 410 can include one or more connections among the processor devices in the heterogeneous computing environment 400. The interconnect 410 may include, for example, a PCIe switch, a 10 or 100 Gigabit Ethernet, or a combination of these and other components. In some examples, the interconnect 410 provides communication between devices of the same type (e.g., between GPUs) and between devices of different types (e.g., between GPUs and ACICs). For instance, the interconnect 410 may connect a GPU to one or more other GPUs via an NVIDIA® GPUDirect framework or another type of framework, or the interconnect 410 may connect a GPU to one or more FPGAs via an NVIDIA® GPUDirect framework or another type of framework. The interconnect 410 may connect the computing devices 408 to the host 402 via the same or a different framework. In some examples, the interconnect 410 connects one or more GPUs and FPGAs to a non-volatile flash memory resource, for instance, via an NVMe framework or another framework. In some examples, an FPGA or ASIC memory controller can connect the GPU array to a flash memory device.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of examples have been described. Nevertheless, it will be understood that various modifications can be made. Accordingly, other implementations are within the scope of the following claims.

The invention claimed is:

1. A heterogeneous computing method comprising:
   identifying a computer program to be executed in a heterogeneous computing system, the heterogeneous computing system comprising a quantum processor unit and a classical processor unit, the quantum processor unit comprising a plurality of devices;
   characterizing the quantum processor unit, wherein characterizing the quantum processor unit comprises determining initial values of parameters and operating frequencies of the plurality of devices;
   after characterizing the quantum processor unit, establishing real-time control of the quantum processor unit; and
   during the real-time control of the quantum processor unit:
   executing a first data processing task in the computer program by operation of the classical processor unit in the heterogeneous computing system;

executing a second data processing task in the computer program by operation of the quantum processor unit, the second data processing task comprising one or more quantum logic gates to be performed by one or more of the plurality of devices;

determining current values of the parameters and operating frequencies of the plurality of devices; and accounting for signal drift based on the current values of the parameters and operating frequencies of the plurality of devices.

2. The method of claim 1, wherein the plurality of devices comprises qubit devices and readout devices, and executing the second data processing task comprises:

performing, by operation of the qubit devices, the one or more quantum logic gates on respective qubits defined by the qubit devices; and performing, by operation of the readout devices, readout operations to extract information from the qubit devices.

3. The method of claim 2, wherein the plurality of devices comprises coupler devices, and performing the one or more quantum logic gates comprises applying control signals to one or more of the coupler devices.

4. The method of claim 1, wherein the one or more quantum logic gates include single-qubit gates and two-qubit gates.

5. The method of claim 1, wherein executing the second data processing task comprises executing a quantum algorithm.

6. The method of claim 5, wherein the quantum algorithm comprises at least one of a computational task, a quantum error correction procedure, or a quantum state distillation procedure.

7. The method of claim 1, comprising, during the real-time control of the quantum processor unit, interweaving overhead operations with the one or more quantum logic gates and readout operations.

8. The method of claim 1, comprising, by operation of a quantum compiler:

receiving data through a client interface; and compiling the data to define at least a portion of the computer program.

9. The method of claim 1, wherein the signal drift comprises signal drift caused by aging or changes in thermal equilibrium.

10. The method of claim 1, wherein determining the current values of the parameters and operating frequencies comprises periodically checking the parameters and operating frequencies.

11. The method of claim 1, wherein establishing the real-time control of the quantum processor unit comprises switching one or more channels of the quantum processor unit from an off-line characterization and testing mode to a real-time computing mode.

12. A heterogenous computing system comprising:

a quantum processor unit comprising a plurality of devices;

a host processor unit configured to perform operations comprising:

identifying a computer program to be executed;

characterizing the quantum processor unit, wherein characterizing the quantum processor unit comprises determining initial values of parameters and operating frequencies of the plurality of devices;

after characterizing the quantum processor unit, establishing real-time control of the quantum processor unit; and during the real-time control of the quantum processor unit:

executing a first data processing task in the computer program;

sending a second data processing task in the computer program to the quantum processor unit for execution by the quantum processor unit, the second data processing task comprising one or more quantum logic gates to be performed by one or more of the plurality of devices;

determining current values of the parameters and operating frequencies of the plurality of devices; and accounting for signal drift based on the current values of the parameters and operating frequencies of the plurality of devices.

13. The system of claim 12, wherein the plurality of devices comprises qubit devices and readout devices, and executing the second data processing task comprises:

performing, by operation of the qubit devices, the one or more quantum logic gates on respective qubits defined by the qubit devices; and performing, by operation of the readout devices, readout operations to extract information from the qubit devices.

14. The system of claim 13, wherein the plurality of devices comprises coupler devices, and performing the one or more quantum logic gates comprises applying control signals to one or more of the coupler devices.

15. The system of claim 12, wherein the one or more quantum logic gates include single-qubit gates and two-qubit gates.

16. The system of claim 12, wherein executing the second data processing task comprises executing a quantum algorithm.

17. The system of claim 16, wherein the quantum algorithm comprises at least one of a computational task, a quantum error correction procedure, or a quantum state distillation procedure.

18. The system of claim 12, comprising, during the real-time control of the quantum processor unit, interweaving overhead operations with the one or more quantum logic gates and readout operations.

19. The system of claim 12, comprising, by operation of a quantum compiler:

receiving data through a client interface; and compiling the data to define at least a portion of the computer program.

20. The system of claim 12, wherein the signal drift comprises signal drift caused by aging or changes in thermal equilibrium.

21. The system of claim 12, wherein determining the current values of the parameters and operating frequencies comprises periodically checking the parameters and operating frequencies.

22. The system of claim 12, wherein establishing the real-time control of the quantum processor unit comprises switching one or more channels of the quantum processor unit from an off-line characterization and testing mode to a real-time computing mode.

23. A heterogeneous computing system comprising:

classical memory configured to store variables defined by a computer program; and a quantum processor unit comprising a plurality of devices; and means for executing the computer program in the heterogeneous computing system, wherein the means for executing the computer program is configured to perform operations comprising, during real-time control of the quantum processor unit:
    determining current values of the parameters and operating frequencies of the plurality of devices; and
    accounting for signal drift based on the current values of the parameters and operating frequencies of the plurality of devices.

24. The system of claim 23, wherein the means for executing the computer program comprises a host processor unit that is programmed to perform operations comprising, during real-time control of the quantum processor unit:
    executing a first data processing task in the computer program; and
    sending a second data processing task in the computer program to the quantum processor unit for execution by the quantum processor unit, the second data processing task comprising one or more quantum logic gates to be performed by one or more of the plurality of devices.

* * * * *